Jan. 5, 1937.   A. H. GROUT   2,067,121
ANTISKID DEVICE
Filed March 23, 1936

Inventor
Aaron H. Grout,

By Clarence A. O'Brien and
Hyman Berman
Attorneys

Patented Jan. 5, 1937

2,067,121

UNITED STATES PATENT OFFICE 2,067,121

ANTISKID DEVICE

Aaron H. Grout, Burlington, Vt.

Application March 23, 1936, Serial No. 70,508

1 Claim. (Cl. 152—14)

The present invention relates to new and useful improvements in anti-skid devices for automobiles and other road vehicles and has for its primary object to provide, in a manner as hereinafter set forth, a device of this character embodying means adapted to bite into the ground in a manner to materially reduce or substantially eliminate side skids.

Another very important object of the invention is to provide a device of the aforementioned character embodying a novel construction and arrangement for connecting the side skid preventing elements to the cross and side chains.

Other objects of the invention are to provide an anti-skid device of the character described which will be comparatively simple in construction, strong, durable, highly efficient and reliable in use, compact, light in weight and which may me manufactured at low cost.

All the foregoing and still further objects and advantages of the invention will become apparent from a study of the following specification, taken in connection with the accompanying drawing wherein like characters of reference designate corresponding parts throughout the several views, and wherein:—

Figure 1:
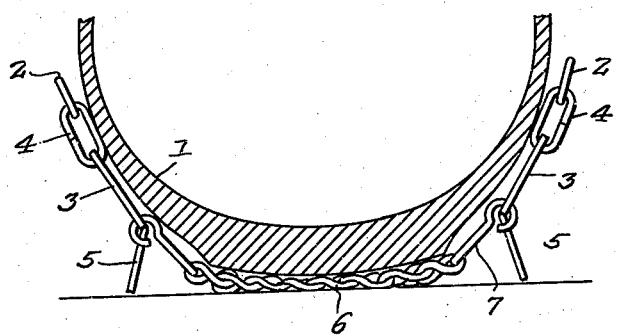
Figure 1 is a cross sectional view through a portion of a pneumatic tire casing, showing an anti-skid device constructed in accordance with the present invention mounted thereon.
Figure 2:
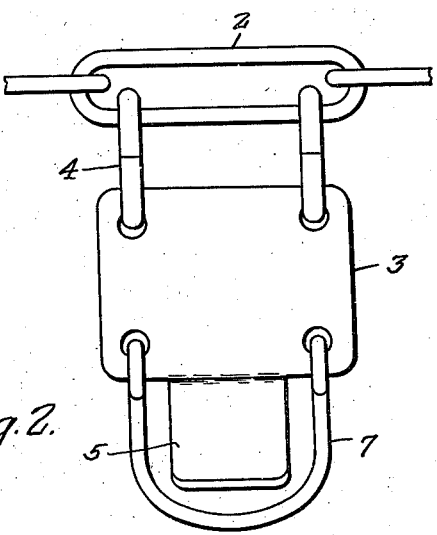
Figure 2 is a fragmentary view in side elevation of the invention, a portion of one of the side chains being shown.

Referring to the drawing in detail, it will be seen that the reference numeral 1 designates a portion of a pneumatic tire casing. The embodiment of the present invention which has been illustrated comprises a pair of side chains 2. The reference numeral 3 designates plates of suitable metal and dimensions which are connected by spaced links 4 to the side chains 2. Formed integrally with the edges of the plates 3 which are remote from the links 4 are angularly projecting ground engaging lugs 5.

The reference numeral 6 designates a cross chain which traverses the tread of the casing 1 and which is connected, at its ends, to the pair of plates 3 by substantially U-shaped couplings 7.

It will thus be seen that the plates 3 are connected to the side chains 2 at spaced points, also that the cross chains 6 are connected to said plates 3 at spaced points. The substantially U-shaped couplings 7, it will be noted, substantially straddle the lugs 5 and are pivotally connected to the plates 3 on opposite sides of said lugs. When a side skid starts the roll of the tire 1, together with the drag of the cross chain 6 against or away from the direction of the skid, causes the lugs 5 to bite into the ground for arresting the skid at its inception and before skid momentum has been gained. It will further be seen that the attachment of the plates 3 by two separate spaced links 4 to the side chains 2 tends to prevent said plates from turning over and becoming useless when the lugs 5 bite into the ground.

It is believed that the many advantages of an anti-skid device constructed in accordance with the present invention will be readily understood, and although a preferred embodiment of said device is as illustrated and described, it is to be understood that changes in the details of construction may be resorted to which will fall within the scope of the invention as claimed.

What is claimed is:—

An anti-skid device of the class described comprising a pair of side chains, a pair of rectangular shaped plates loosely connected to said side chains, ground engaging lugs projecting angularly from said plates, the side of said lugs being spaced inwardly from the side of said plates, substantially U-shaped couplings pivotally connected to the plates on opposite sides of said lugs, and cross chains connected, at their ends, to said substantially U-shaped couplings.

AARON H. GROUT.